(12) United States Patent
Sleight et al.

(10) Patent No.: US 6,183,716 B1
(45) Date of Patent: Feb. 6, 2001

(54) SOLUTION METHOD FOR MAKING MOLYBDATE AND TUNGSTATE NEGATIVE THERMAL EXPANSION MATERIALS AND COMPOUNDS MADE BY THE METHOD

(75) Inventors: Arthur W. Sleight, Philomath; Claire E. Closmann, Corvallis; John C. Haygarth, Corvallis; Kameswari Upadhyayula, Corvallis, all of OR (US)

(73) Assignee: State of Oregon acting by and through the State Board of Higher Education of behalf of Oregon State University, Corvallis, OR (US)

( * ) Notice: Under 35 U.S.C. 154(b), the term of this patent shall be extended for 0 days.

(21) Appl. No.: 09/126,986

(22) Filed: Jul. 30, 1998

Related U.S. Application Data

(60) Provisional application No. 60/055,297, filed on Jul. 30, 1997.

(51) Int. Cl.[7] .................................................. C01G 39/00
(52) U.S. Cl. ........................... 423/593; 423/606; 423/608
(58) Field of Search ..................... 423/593, 606, 423/608; 502/300, 305, 308, 321

(56) References Cited

U.S. PATENT DOCUMENTS 3,941,715 * 3/1976 Shidlovsky .................... 252/301.4 P (List continued on next page.)

FOREIGN PATENT DOCUMENTS 54-053700 * 4/1979 (JP) .
54-057500 * 5/1979 (JP) .
54-065200 * 5/1979 (JP) .

OTHER PUBLICATIONS

Clearfield et al., "The Preparation of a Crystalline Basic Zirconium Tungstate," *J. Inorg. Nucl. Chem.*, 36:1174–1176 (1974).*

(List continued on next page.)

*Primary Examiner*—Tom Dunn
*Assistant Examiner*—Cam N. Nguyen
(74) *Attorney, Agent, or Firm*—Klarquist Sparkman Campbell Leigh & Whinston, LLP

(57) ABSTRACT

A method for making negative thermal expansion materials having the formula $$A^{4+}M_2^{6+}O_8$$

where $A^{4+}$ is $Zr^{4+}$, $Hf^{4+}$, or mixtures thereof, and $M^{6+}$ is $Mo^{6+}$, $W^{6+}$, or mixtures thereof, is described. The method comprises first forming an acidic, liquid mixture comprising stoichiometric amounts of (1) a soluble source of $Zr^{4+}$, $Hf^{4+}$, or mixtures thereof, and (2) a sodium-ion-free tungstate salt, a sodium-ion-free molybdate salt, or mixtures thereof. This liquid mixture is then heated, either at reflux temperature or in a closed system at pressures greater than ambient, to produce a solid fraction. The solid fraction is separated from the liquid mixture and heated a second time at a temperature and for a period of time sufficient to form compounds having the formula $$A^{4+}M_2^{6+}O_8.$$

The solid fraction generally is heated within the temperature range of from about 500° C. to less than about 700° C. An alternative embodiment of the method involves adding a fuel material to the materials listed above before the final heating step. A currently preferred fuel material is urea. The fuel material apparently undergoes an exothermic reaction that provides additional energy to help produce the desired compound. The use of the fuel has substantially reduced the reaction time, such as to less than an hour, and in certain embodiments the first heating cycle has been completed in about fifteen minutes. Novel negative thermal expansion materials made by the method also are described. Such novel negative thermal expansion materials have the formula $$A_{1-x}^{4+}A_x'^{4+}M_{2-y}^{6+}M_y'^{6+}O_8$$

where $A^{4+}$ and $A'^{4+}$ are $Hf^{4+}$ or $Zr^{4+}$, $M^{6+}$ and $M'^{6+}$ are $W^{6+}$ or $Mo^{6+}$, X is from 0 to 1, and Y is from about 0.05 to $\leq 2$.

36 Claims, 13 Drawing Sheets

U.S. PATENT DOCUMENTS

| | | | | |
|---|---|---|---|---|
| 3,969,123 | * | 7/1976 | Holcombe, Jr. et al. | 106/55 |
| 4,112,194 | * | 9/1978 | Chenot et al. | 428/539 |
| 5,322,559 | * | 6/1994 | Sleight et al. | |
| 5,433,778 | * | 7/1995 | Sleight et al. | 106/401 |
| 5,514,360 | * | 5/1996 | Sleight et al. | 423/593 |
| 5,681,500 | * | 10/1997 | Obata et al. | 252/62.51 R |
| 5,780,767 | * | 7/1998 | Matsuda et al. | 149/2 |
| 5,872,329 | * | 2/1999 | Burns et al. | 149/36 |

OTHER PUBLICATIONS

S. Palitsyna et al., "Synthesis and Some Properties of Basic Crystalline Hafnium," *Bulletin of the Academy of Sciences, U.S.S.R., Division of Chemical Sciences*, 26:611–613 (1977).*

* cited by examiner

Lattice Parameter of $ZrW_{1.6}Mo_{.4}O_8$
As a Function of Temperature

SOLUTION METHOD FOR MAKING MOLYBDATE AND TUNGSTATE NEGATIVE THERMAL EXPANSION MATERIALS AND COMPOUNDS MADE BY THE METHOD

CROSS REFERENCE TO RELATED APPLICATION

This application claims priority from copending U.S. Provisional Patent Application No. 60/055,297, filed on Jul. 30, 1997, which is incorporated herein by reference.

ACKNOWLEDGEMENT OF SUPPORT

This invention was developed with funds from NSF grant No. DMR-9308530. The federal government may have rights in this invention.

FIELD OF THE INVENTION

The present invention concerns a method for making negative thermal expansion (NTE) materials, particularly molybdate and tungstate NTE materials, and compositions and devices comprising such materials.

BACKGROUND OF THE INVENTION

Negative thermal expansion materials are unique in that they expand upon cooling and contract upon heating. By combining negative thermal expansion materials with other common materials, such as ceramics, compositions can be formed which resist expansion on heating and contraction upon cooling. Negative thermal expansion materials also are useful for adjusting the thermal expansion of a composition to match that of another material which it contacts. Particularly useful are NTE materials which expand or contract isotropically, i.e, to substantially the same extent in all dimensions.

A number of U.S. patents concern negative thermal expansion materials and methods for making such materials, including Arthur Sleight's U.S. Pat. Nos. 5,322,559 and 5,514,360, which are incorporated herein by reference. Sleight's '360 patent describes a method for making zirconium and hafnium tungstates. The method involves heating mixtures comprising appropriate amounts of starting reagents. But, the temperatures required to produce single-phase compounds have heretofore been higher than 1,100° C. Sleight's '360 patent states that "the production of single-phase compounds generally has required heating temperatures to be at least as high as about 1165° C. [and] typically should be from about 1165° C. to about 1250° C. . . ." Sleight's '360 patent, column 3, lines 17–19. Example 5 of Sleight's '360 supports this conclusion. The material produced according to Example 5 of Sleight's '360 patent includes both crystalline $ZrW_2O_8$ and $WO_3$.

Several literature reports also discuss the production of zirconium and hafnium compounds. See, for example, (1) Clearfield and Blessing's "The preparation of a Crystalline Basic Zirconium Tungstate," *J. Inorg. Nucl. Chem.*, 36:1174–1176 (1974); and (2) S. Palitsyna et al.'s "Synthesis and Some Properties of Basic Crystalline Hafnium," *Bulletin of the Academy of Sciences, U.S.S.R., Division of Chemical Sciences*, 26:611–613 (1977). Clearfield et al. teach a method for synthesizing $ZrW_2O_7(OH)_2(H_2O)_2$ by combining zirconium oxychloride octahydrate ($ZrOCl_2.8H_2O$) with sodium tungstate ($Na_2WO_4.2H_2O$), followed by heating the precipitate and mother liquor formed by the combination. The solution is acidified and refluxed for "several days." Clearfield et al., supra, p. 1175.

The solid is then collected and washed with hydrochloric acid to remove sodium ion. Id.

Palitsyna et al. describe the synthesis of a hafnium tungstate by combining hafnium oxychloride octahydrate ($HfOCl_2.8H_2O$) with sodium tungstate dihydrate ($Na_2WO_4.2H_2O$). The hydrate formed by this reaction and subsequent workup is then heated to temperatures greater than 500° C. (presumably celsius; the publication does not say) to form the crystalline hafnium tungstate.

Several problems have been identified with methods developed prior to the present invention for making zirconium and hafnium tungstates. First, such methods produce substantially single-phase compounds only at elevated temperatures, and generally only after long heating periods, which are significant drawbacks to developing an efficient, commercially viable process. Second, previous methods limited the number of different NTE compounds that could be made because they allowed only for the substitution of hafnium for zirconium; no other elemental substitutions apparently have been possible using prior synthetic methodologies. And, prior methods ostensibly designed to make zirconium and hafnium tungstates do not reproducibly produce such compounds. In fact, commercial preparations sold as zirconium tungstate have been found to include little or no zirconium tungstate.

Based on the above, it is apparent that there is a need for a new method for reproducibly forming known negative thermal expansion materials as substantially single-phase compounds at substantially reduced temperatures relative to known methods. There also is a need for a method which allows for the synthesis of novel negative thermal expansion materials.

SUMMARY OF THE INVENTION

The present invention concerns a new method for making molybdate and tungstate NTE materials that solves many of the problems identified for prior synthetic methodologies. First, substantially single-phase crystalline compounds can be made according to the present method at temperatures much lower than that of known methods, such as at temperatures within the range of from about 500° C. to about 700° C. As used herein, the phrase "substantially single phase" means that compounds produced by the method have purities of 95% by weight or greater. Second, the present method can be used to form new classes of negative thermal expansion materials, particularly molybdate and tungstate compounds, that apparently could not be made by previous methods. Third, the time required to produce desired compounds is substantially decreased by the present method.

One novel feature of the present invention is the recognition that sodium-ion-containing reagents contribute significantly to the problems identified for prior synthetic methods. As a result, reagents containing sodium ions are not used to practice the present method and this has been found to substantially increase the efficiency and reproducibility of the method.

One embodiment of the present method comprises making compounds having the formula $$A^{4+}M^{6+}_2O_8,$$

where $A^{4+}$ is $Zr^{4+}$, $Hf^{4+}$, or mixtures thereof, and $M^{6+}$ is $Mo^{6+}$, $W^{6+}$, or mixtures thereof. The method first comprises heating an acidic, liquid mixture comprising stoichiometric amounts of (1) a soluble source of $Zr^{4+}$, $Hf^{4+}$, or mixtures thereof, and (2) a sodium-ion-free tungstate salt, a sodium-ion-free molybdate salt, or mixtures thereof, to form a solid fraction. This first heating step generally comprises refluxing the liquid mixture. But, the liquid reaction mixture also can be heated at pressures significantly greater than ambient in closed systems, such as Parr bombs. Working embodiments of the present method have heated the liquid reaction mixture in closed systems to pressures within the range of from about 200 psi to about 300 psi, with 250 psi being a currently preferred pressure. Heating the reaction mixture at pressures greater than ambient substantially reduces the reaction time. For example, the liquid reaction mixture must be heated for about 48 hours at ambient pressures, or pressures close to ambient, for the reaction to proceed substantially to completion. Heating the same reaction mixture in a closed system reduces the reaction time to about 4–5 hours.

Generally, but not necessarily, the liquid solution comprises an aqueous solution. Furthermore, working embodiments of the method predominantly have used ammonium tungstate as the sodium-ion-free tungstate salt, ammonium molybdate as the sodium-ion-free molybdate salt, and oxyhalides or oxynitrates to provide the soluble source of $Zr^{4+}$ and/or $Hf^{4+}$.

The solid fraction produced in the first heating step is separated from the liquid mixture and heated sufficiently to form compounds having the formula $$A^{4+}M_2^{6+}O_8.$$

The temperature range for heating the solid fraction to form desired NTE compounds is within the range of from about 500° C. to less than about 700° C., and more preferably is within the temperature range of from about 500° C. to about 600° C.

A currently preferred method for making compounds according to the formula $$A^{4+}M_2^{6+}O_8$$

comprises first forming an aqueous mixture that includes appropriate amounts of (1) a zirconium oxyhalide, a zirconium oxynitrate, a hafnium oxyhalide, a hafnium oxynitrate, or mixtures thereof, and (2) ammonium tungstate, ammonium molybdate, or mixtures thereof. This reaction mixture is then acidified by the addition of a mineral acid, such as HCl, $H_2SO_4$ or $HNO_3$. The acidified mixture is refluxed, or heated in a closed system, to form a solid fraction. The solid fraction is separated from the mixture and heated to a temperature of from about 500° C. to less than about 700° C. for a period of time sufficient, such as about 48 hours, to form a compound having the formula $$A^{4+}M_2^{6+}O_8.$$

An alternative embodiment of the method involves adding a fuel material to materials listed above before the final heating step. A currently preferred fuel material is urea, although carbohydrazide also has been used in working embodiments. The fuel material apparently undergoes an exothermic reaction that provides additional energy to help produce the desired compound. The use of the fuel has substantially reduced the reaction time, such as to less than an hour, and in certain embodiments the first heating cycle has been completed in about fifteen minutes.

To practice the embodiment utilizing fuel, an aqueous nitric acid mixture of appropriate amounts of (1) a soluble source of $Zr^{4+}$, $Hf^{4+}$, or mixtures thereof, and (2) a sodium-ion-free tungstate salt, a sodium-ion-free molybdate salt, or mixtures thereof, is formed. Fuel, such as urea, is then added to this mixture. The fuel-containing mixture is then heated to a temperature of from about 500° C. to about 600° C. for a period of time, such as less than about an hour, to form compounds satisfying the formula provided above.

The present method has allowed several new negative thermal expansion materials to be made. Such novel negative thermal expansion materials have the formula $$A^{4+}_{1-x}A'^{4+}_x M^{6+}_{2-y}M'^{6+}_y O_8$$

where $A^{4+}$ and $A'^{4+}$ are $Hf^{4+}$ or $Zr^{4+}$, $M^{6+}$ and $M'^{6+}$ are $W^{6+}$ or $Mo^{6+}$, X is from 0 to 1, and Y is from about 0.05 to $\leq 2$. Examples of compounds satisfying this formula include, solely by way of example, $ZrWMoO_8$, $ZrW_{1.6}Mo_{0.4}O_8$ and $ZrW_{0.5}Mo_{1.5}O_8$.

DETAILED DESCRIPTION OF THE PREFERRED EMBODIMENTS

I. GENERAL SYNTHETIC METHOD

Figure 1:
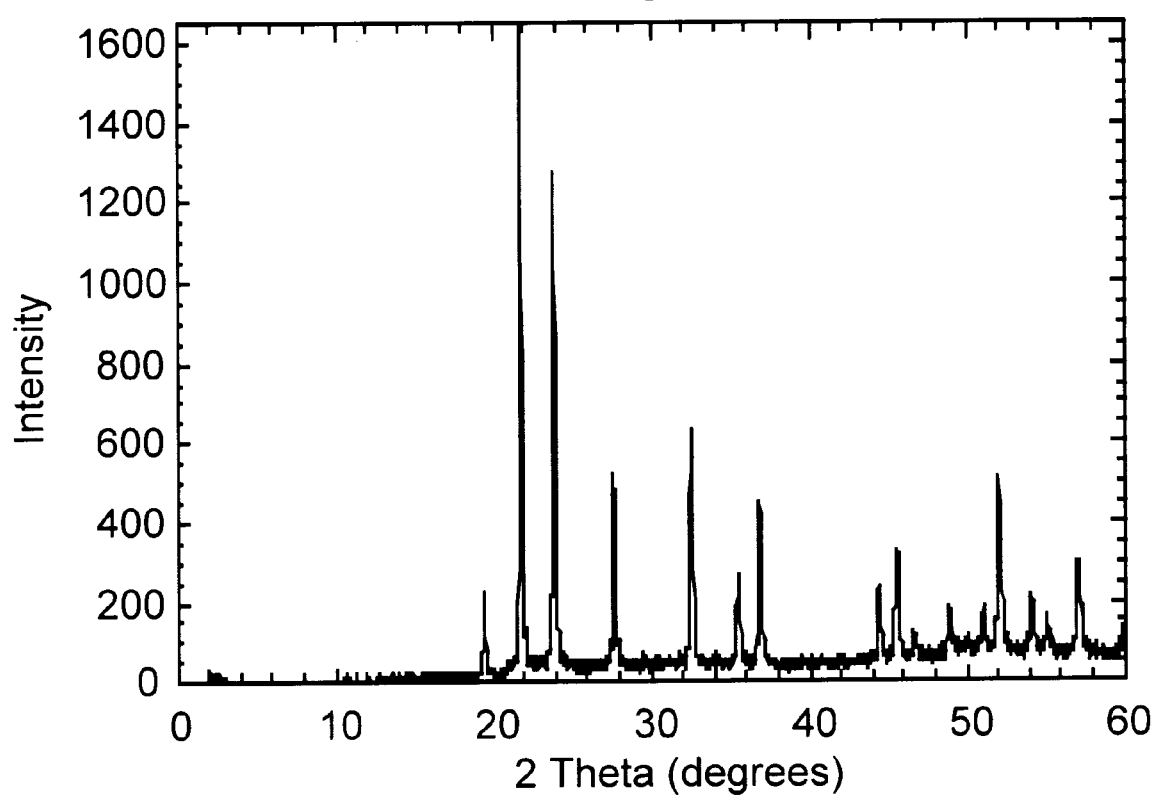
FIG. 1 is an X-ray diffraction pattern of $ZrWMoO_8$.

The present invention can be used to make a variety of compounds, but primarily is directed to making NTE compounds having Formula 1

$$A^{4+}M_2^{6+}O_8$$

Formula 1 where $A^{4+}$ is Zr, Hf, or mixtures thereof, and $M^{6+}$ is Mo (molybdate compounds), W (tungstate compounds), or mixtures thereof (mixed molybdate-tungstate compounds). Molybdate, tungstate and mixed molybdate-tungstate compounds are synthesized according to the present invention by (1) forming acidic mixtures comprising acidic liquid solutions having sources of soluble metal species (generally metal ions) that provide elements in appropriate relative amounts for forming such desired compounds, (2) heating the solutions, (3) separating a solid fraction from the liquid solution, and (4) heating the solid fraction sufficiently to form the desired products. The method can optionally include the step of adding a fuel material such as urea, to the soluble sources of metal species. In this case, only a first heating step, and no intermediate step, is used to produce the desired compounds. All embodiments of the method also can include a final, but optional, sintering step to enhance the production of substantially single-phase materials.

A. Reagents and Reagent Solutions

Generally, the liquid solutions used to practice the present invention are aqueous solutions. Solvents other than water also may be used as long as the reagents required to make desired compounds are sufficiently soluble in the solvent selected. Alcohols are one class of solvents other than water that can be used to practice the present invention. Suitable alcohols for practicing the present invention include, without limitation, methanol, ethanol, and mixtures thereof. Saturated solutions of reagents of limited solubility in the selected solvent, as opposed to complete dissolution of the amount of reagent required, also can could be used as long as each reagent is sufficiently soluble in the solvent to provide adequate dissolved species for reaction with the other reagents.

The following discussion is directed to aqueous processing. But, based on the above, it should be understood that other solvents also may be used in the manner described below with respect to aqueous processing.

Several general types of reagents are combined to practice the method of the present invention. The metal of a first class of reagents is hafnium or zirconium. A second class of reagents is used to provide $W^{6+}$ and/or $Mo^{6+}$. The $W^{6+}$- and $Mo^{6+}$-providing reagents generally include cations. Compounds which do not include sodium cations are preferred for practicing the present method. A third type of material can be used, and is referred to herein as a fuel material.

With reference to aqueous processing, water-soluble zirconium and hafnium compounds useful for practicing the present invention can be selected by considering several factors including availability, cost, toxicity and water-solubility. Without limitation, water-soluble hafnium and zirconium compounds useful for practicing the method of the present invention can be selected from the group consisting of oxyhalides (e.g., $ZrOCl_2$, $ZrOBr_2$, $ZrOI_2$, $HfOCl_2$, $HfOBr_2$ and $HfOI_2$), oxynitrates [e.g., $ZrO(NO_3)_2$ and $HfO(NO_3)_2$], and mixtures thereof.

A water-soluble $W^{6+}$ and/or $Mo^{6+}$ species also is used. The $W^{6+}$ or $Mo^{6+}$ species is selected by identifying candidate reagents, and then culling the list of reagents to determine those most useful for making a particular desired compound by eliminating all reagents that include sodium cations and applying the list of factors described above with respect to the zirconium and hafnium reagents. Good results have been obtained by using ammonium tungstate reagents, such as ammonium metatungstate and paratungstate. Ammonium metatungstate is a currently preferred reagent, primarily because it is more soluble in water than other ammonium tungstate compounds. Ammonium molybdate is an example of a suitable sodium-ion-free source of $Mo^{6+}$.

The fuel material is selected to provide an exothermic redox reaction. A currently preferred fuel material is urea, but a person skilled in the art will understand that additional materials also can be used as the fuel material, such as hydrazine-based fuels, including carbohydrazide, oxalic acid dihydrazide, maleichyrazides, 3-methyl-3-pyrazolin-5-one, and mixtures thereof.

B. General Process Steps Without the Use of Fuel

The first general process step involves forming a sodium-ion-free solution (or perhaps a suspension) comprising (a) a hafnium- and/or zirconium-providing reagent, and (b) a tungstate and/or molybdate salt. Each reagent is used in "stoichiometric amounts." "Stoichiometric amounts" is defined herein as amounts required to form desired end-products having preselected relative amounts of elements. For example, to make $ZrW_{1.6}Mo_{0.4}O_8$, "stoichiometric amounts" refers to selecting amounts of a zirconium-providing reagent, a tungsten-providing reagent and a molybdenum-providing reagent that, when reacted together, produce $ZrW_{1.6}Mo_{0.4}O_8$. Working embodiments of the present method have used about 0.2 moles $ZrOCl_2$, about 0.04 moles of ammonium metatungstate, and about 0.01 moles of ammonium molybdate to make $ZrW_{1.6}Mo_{0.4}O_8$. The ratio of these materials (i.e., $ZrOCl_2$:ammonium metatungstate:molybdic acid) used in working embodiments of the present method therefore has been about 20:4:1. These ratios provide some guidance as to relative amounts to be used; however, persons skilled in the art will realize that these ratios might have to be adjusted to make different compounds, and to optimize the efficiency of producing a particular compound.

Moreover, "stoichiometric amounts" does not require that the amounts of reagents provided in solution or suspension correlate directly with the ratios of elements in the final desired product. A reaction may be more efficient for forming a desired product if one or more reagents is provided in excess of that of the desired product.

One method for forming liquid solutions (or suspensions) is simply to add each reagent and the amount of solvent required to dissolve the reagents or form the suspension into a container, preferably with agitation or continuous stirring. Another method is to form separate liquid solutions of each reagent and then to combine these solutions. For example, to make novel mixed tungstate-molybdate compounds, such as $ZrW_{1.6}Mo_{0.4}O_8$ three solutions are formed, the first comprising a zirconium reagent, the second comprising a sodium-ion-free tungstate reagent and the third comprising a sodium-ion-free molybdate reagent. The solutions comprising the tungstate and molybdate reagents are then combined to form a liquid composition having the desired concentration of each reagent. The zirconium-providing reagent (e.g., an oxyhalide or oxynitrate) is then added to this liquid composition to form a reaction mixture suitable for further processing.

The second general process step involves acidifying the aqueous composition by the addition of a mineral acid. Hydrochloric acid solutions (e.g., 6M HCl acid solutions) predominantly have been used in working processes. Other mineral acids, such as sulfuric acid, also can be used. The optimum amount of mineral acid to be added has not yet been determined. Working embodiments have added sufficient amounts of acid to obtain very low solution pH values, such as pH values of zero or less. Acids also are added to the reaction mixture to elevate the boiling point. Thus, mineral acids suitable for practicing the present invention, and the amounts thereof, are best determined by considering mineral acids which are both (1) useful for acidifying the mixture, and (2) which maximize the boiling point elevation resulting from such addition.

The next general process step involves heating the acidified solution or suspension for a period of time sufficient to form a solid fraction. "Heating" in this context generally refers to refluxing the liquid reaction mixture or heating the liquid reaction mixture in a closed system NTE materials have been formed successfully by refluxing the acidified aqueous solutions for a period of about forty-eight hours. Heating at elevated pressures generally shortens the reaction time. For example, compounds have been made by heating closed aqueous systems using Parr bombs to obtain pressures of from about 200 psi to about 300 psi, and preferably about 250 psi. Heating the reaction mixture at pressures greater than ambient generally continues for a period of from about 1 to about 24 hours, and more typically from about 3 to about 5 hours. But, a preferred reaction time for forming a particular compound using a particular combination of reagents is best determined empirically.

After the first heating step is completed, the solid fraction is separated from the aqueous fraction and dried. Filtration generally has been used to separate the solid fraction. The solid fraction is then dried using conventional methods, such as by further aspirated or vacuum filtration, drying over a drying reagent, drying in a desiccator, perhaps under vacuum, or any combination of these methods.

The isolated and dried solid fraction is then heated to form a crystalline, substantially single-phase compound having the desired formula. A departure from prior methods is that the compounds can be produced as substantially single-phase materials by heating the solid fraction to temperatures much lower than 1,100° C. Working processes have heated the solid fraction to temperatures less than 700° C., and typically from about 500° C. to about 600° C. The compounds generally are placed in a furnace, which is then heated (e.g., at a rate of about 10° C./minute) to a temperature within the desired temperature range. Once a temperature within the desired range is reached, working embodiments of the method have continued heating the compounds for relatively short periods of time, such as from about 1 to about 5 hours.

C. General Process Steps Used When Using Fuel

The first general process step involves forming a sodium-ion-free acidic solution (or perhaps a suspension) comprising (a) a hafnium- and/or zirconium-providing reagent, and (b) a tungstate and/or molybdate salt. Each reagent is used in stoichiometric amounts. $HNO_3$ solutions predominantly have been used in working processes. The optimum amount of nitric acid to be added generally has been stoichiometric amounts.

The next general process step involves heating the acidified solution or suspension for a period of time sufficient to form the desired compounds. "Heating" in this context typically refers to heating the mixture to a temperature of generally less than about 700° C., and typically from about 500° C. to about 600° C. The compounds are placed in a furnace preheated to the desired temperature range. Working embodiments of the method have continued heating the compounds for relatively short periods of time, such as less than about an hour, and typically only for about 15 minutes.

II. NOVEL COMPOUNDS MADE BY THE METHOD

The method of the present invention allows for the formation of novel compounds by elemental substitutions that apparently could not be accomplished by prior synthetic methodologies. For example, using the method of the present invention Mo has been substituted, at least in part, for W. Furthermore, for those compounds where Mo has been substituted for W, Hf also can be substituted, in whole or in part, for Zr. Such novel compounds therefore have the formula

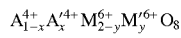

where $A^{4+}$ and $A'^{4+}$ are Hf or Zr, $M^{6+}$ and $M'^{6+}$ are W or Mo, X is from 0 to 1, and Y is from about 0.05 to $\leq 2$.

Figure 2:
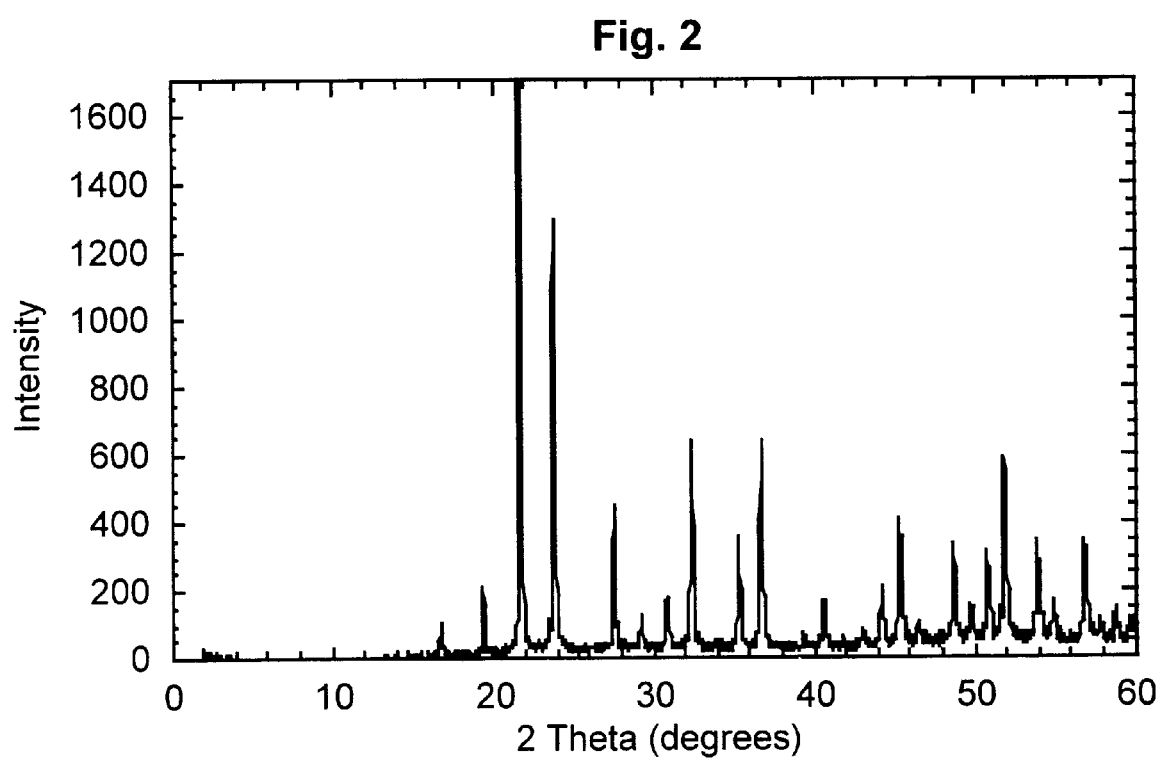
FIG. 2 is an X-ray diffraction pattern of $ZrW_{1.6}Mo_{0.4}O_8$.
Figure 3:
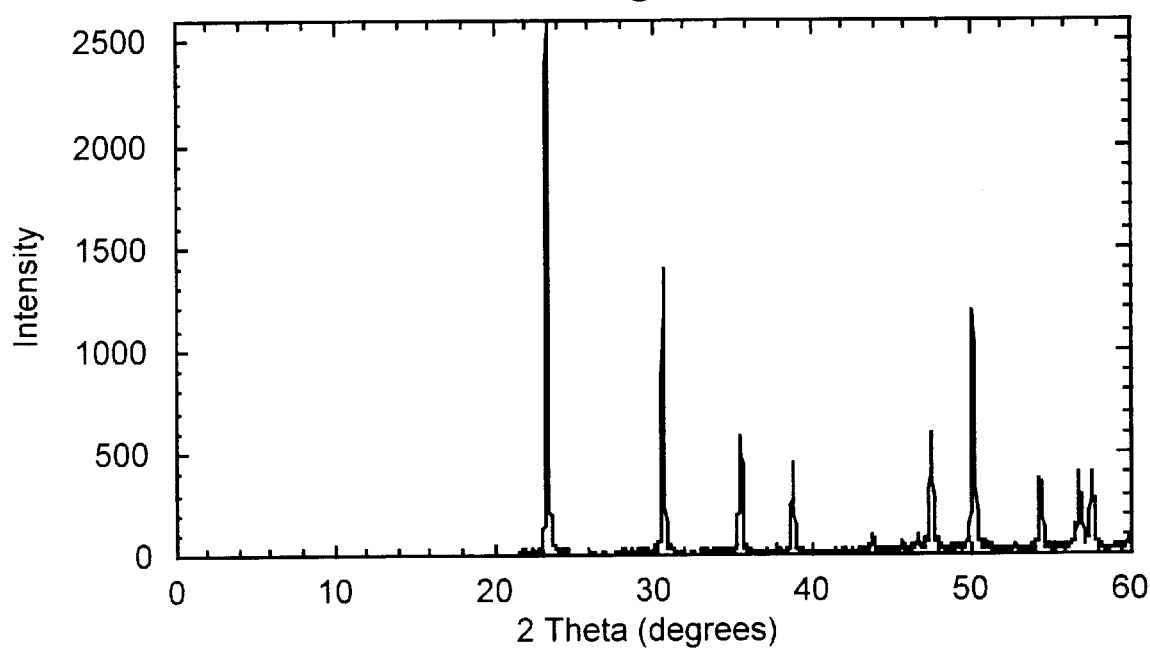
FIG. 3 is an X-ray diffraction pattern of $ZrW_{0.5}Mo_{1.5}O_8$.

Examples, without limitation, of novel compounds that have been made by the method include $ZrWMoO_8$ (where X=0; Y=1; $A^{4+}$=Zr; $M^{6+}$=W; $M'^{6+}$=Mo), $ZrW_{1.6}Mo_{0.4}O_8$ (where X=0; Y=0.4; $A^{4+}$=Zr; $M^{6+}$=W; $M'^{6+}$=Mo) and $ZrW_{0.5}Mo_{1.5}O_8$ (where X=0; Y=1.5; $A^{4+}$=Zr; $M^{6+}$=W; $M'^{6+}$=Mo). FIGS. 1–3 are X-ray diffraction patterns for $ZrWMoO_8$, $ZrW_{1.6}Mo_{0.4}O_8$ and $ZrW_{0.5}Mo_{1.5}O_8$, respectively. These diffraction patterns were obtained to confirm the structures of these novel compounds following their production according to the method of the present invention.

III. THERMAL EXPANSION

Figure 4:
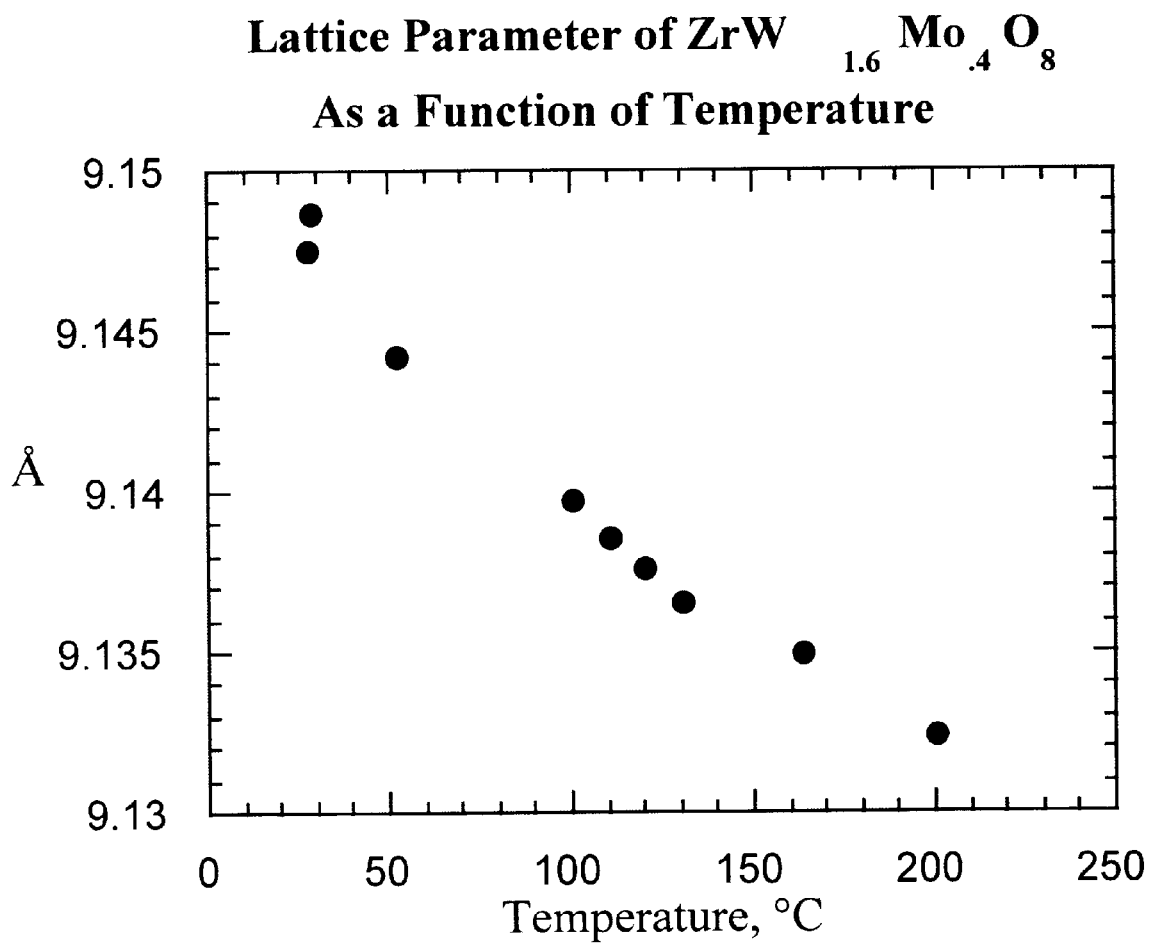
FIG. 4 is a thermal expansion curve for the NTE compound of FIG. 2.

Thermal expansion data has been obtained for those compounds made according to the method of the present invention and all such compounds appear to be NTE compounds. FIG. 4 is a thermal expansion curve (i.e., unit cell lattice parameters as a function of temperature from 0° C. to 250° C.) for $ZrW_{1.6}Mo_{0.4}O_8$. FIG. 4 shows that the lattice parameters for $ZrW_{1.6}Mo_{0.4}O_8$ decrease upon heating, which means that the unit cell contracts as the material is heated.

The thermal expansion coefficient, α, also has been calculated for several compounds made according to the present invention. These calculations have been done using the formula $\alpha = l_{T2} - l_{T1}/l_{T1} \times (T2-T1)$. An α value of about $1.1637 \times 10^{-5}$ °$C.^{-1}$ was obtained for $ZrW_{1.6}Mo_{0.4}O_8$ using the data in Table 1.

TABLE 1

| | Temperature (° C.) | a |
|---|---|---|
| 0. | 27 | 9.1476 |
| 1. | 52 | 9.1443 |
| 2. | 100 | 9.1398 |
| 3. | 110 | 9.1386 |
| 4. | 120 | 9.1377 |
| 5. | 130 | 9.1366 |
| 6. | 163 | 9.1350 |
| 7. | 200 | 9.1325 |
| 8. | 28 | 9.1487 |

IV. EXAMPLES

The following examples are provided to illustrate certain features of methods useful for forming compounds having negative thermal expansion properties. These examples should not be construed to limit the present invention to those particular features described.

Certain of the process steps require forming solutions of materials having appropriate amounts of each desired reagent. The reagents may be prepared from hydrates. To determine how much of each reagent to use to form aqueous solutions with correct reagent amounts, one gram of each reagent was heated at elevated temperature and then reweighed. For example, one gram of ammonium metatungstate, zirconium oxychloride hydrate and molybdic acid were heated to 900° C. to drive off all components except $WO_3$, $ZrO_2$ and $MoO_3$, respectively. These materials were then reweighed to determine the amount of each reactive species made available by each reagent.

The structure and purity of compounds made according to the principles illustrated in the examples were determined by X-ray diffraction data. Powder X-ray diffraction data were recorded using Cu K α radiation with a Siemens D5000 diffractometer equipped with vertical Soller slits, computer-controlled antiscatter slits, and an energy-dispersive Kevex detector. Variable-temperature control was achieved using an in-house-designed resistively heated aluminum sample holder. Sample temperatures were read using a type K thermocouple situated next to the heater elements. High-temperature spectra were recorded with a step size of 0.02° 2 α and a step time of 0.5 second. Longer step times were used (7 seconds) for spectra used for detailed Rietveld analysis.

Thermal analyses were performed on samples made according to the principles illustrated in the examples and shown to be single-phase products by X-ray diffraction. A Netzsch thermal analysis system was used to obtain dilatometer data. Fused silica was used for the internal components of the dilatometer. A sapphire standard was used for calibration purposes.

Example 1

This example describes the synthesis of $ZrW_{1.6}Mo_{0.4}O_8$. Aqueous solutions of 0.5M $ZrOCl_2$ and 1M ammonium metatungstate were prepared. An 0.73M molybdic acid solution also was prepared by dissolving molybdic acid in ammonium hydroxide. 13.75 ml of the molybdic acid solution were combined with 40 ml of the ammonium metatungstate solution to form a new solution. 50 ml of this new solution were then combined with 46.5 ml of the 0.5M $ZrOCl_2$ solution by simultaneous dropwise addition from burets to 25 ml water. The addition of the $ZrOCl_2$ solution was accompanied by continuous stirring. A soft white precipitate was produced during the addition. The mixture was stirred continuously overnight at room temperature.

The solution was then acidified by the addition of 125 ml of 6M HCl. The resulting mixture was poured into a 500 ml round bottom flask and refluxed for about 48 hours. The reaction mixture was allowed to cool to room temperature and the precipitate settled to the bottom of the flask. A clear liquid was decanted and suction filtration used to separate the precipitate from the remaining liquid. This produced a creamy white gel.

The gel was allowed to sit for one week. An X-ray diffraction pattern of the gel closely resembled that of $ZrW_2O_7(OH)_2(H_2O)_2$. The gel was then placed in a furnace, which was subsequently heated at a rate of about 10° C./minute until a furnace temperature of about 600° C. was obtained. The gel was heated at 600° C. for thirty minutes to produce a nicely crystalline powder having the structure $ZrW_2O_8$. Heating the powder for a longer period of time likely would have produced even more crystallinity. At 700° C. the material begun to dissociate into separate oxide components.

Example 2

This example concerns the synthesis of $ZrWMoO_8$. Aqueous solutions of 0.5M $ZrOCl_2$, 1M ammonium metatungstate and 0.5M molybdic acid were prepared. 50 ml of the molybdic acid solution were combined with 25 ml of the 1M ammonium metatungstate solution to form a new solution. This new solution was then combined with 50 ml of the 0.5M $ZrOCl_2$ solution by simultaneous dropwise addition from burets into 25 ml water. The addition of the $ZrOCl_2$ solution was accompanied by continuous stirring. A soft white precipitate was produced during the addition. After adding the total amount of each solution to the reaction vessel, the mixture was stirred continuously at room temperature overnight.

The solution was then acidified by the addition of 125 ml of 6M HCl. The resulting mixture was poured into a 500 ml round bottom flask and refluxed for about 48 hours. The solution was allowed to cool to room temperature and the precipitate settled to the bottom of the flask. A clear liquid was decanted and suction filtration used to separate the precipitate from the remaining liquid. This produced a creamy white gel, which was allowed to sit for one week. An X-ray diffraction pattern of the gel closely resembled $ZrMo_2O_7(OH)_2(H_2O)_2$ (which is essentially indistinguishable from that of $ZrW_2O_7(OH)_2(H_2O)_2$) before heating.

The gel was then placed in a furnace. The temperature was increased at a rate of about 10° C./minute until a furnace temperature of about 500° C. was obtained. Heating the gel for thirty minutes at 500° C. produced a nicely crystalline powder having the structure $ZrWMoO_8$. X-ray diffraction showed that the crystalline powder obtained the structure of the high-temperature phase of $ZrW_2O_8$.

Example 3

This example concerns the synthesis of $ZrW_{0.5}Mo_{1.5}O_8$. Aqueous solutions of 0.5M $ZrOCl_2$, 1M ammonium metatungstate and 0.5M molybdic acid solution were prepared. 75 ml of the molybdic acid solution were combined with 12.5 ml of the 1M ammonium metatungstate solution to form a new solution. This new solution was then combined with 50 ml of the 0.5M $ZrOCl_2$ solution by simultaneous dropwise addition from burets into 25 ml water. The addition of the $ZrOCl_2$ solution was accompanied by continuous stirring. A soft white precipitate was produced during the addition. The reaction mixture was stirred continuously at room temperature overnight.

The solution was then acidified by the addition of 125 ml of 6M HCl. The resulting mixture was poured into a 500 ml round bottom flask and refluxed for about 48 hours. A clear liquid was decanted after letting the solution cool to room temperature and the precipitate settled to the bottom of the flask. Suction filtration was used to separate the precipitate from the remaining liquid, which produced a creamy white gel. The gel was allowed to sit for one week. An X-ray diffraction pattern of the gel closely resembled $ZrMo_2O_7(OH)_2(H_2O)_2$ (which is essentially indistinguishable from that of $ZrW_2O_7(OH)_2(H_2O)_2$) before heating.

The gel was then placed in a furnace and heated by increasing the temperature at a rate of about 10° C./minute until a furnace temperature of about 600° C. was obtained. The gel was heated for thirty minutes at 600° C. to produce a nicely crystalline powder having the structure $ZrW_{0.5}Mo_{1.5}O_8$. The X-ray diffraction pattern showed that the crystalline powder obtained the structure of the high-temperature phase of $ZrMo_2O_8$.

Example 4

Figure 5:
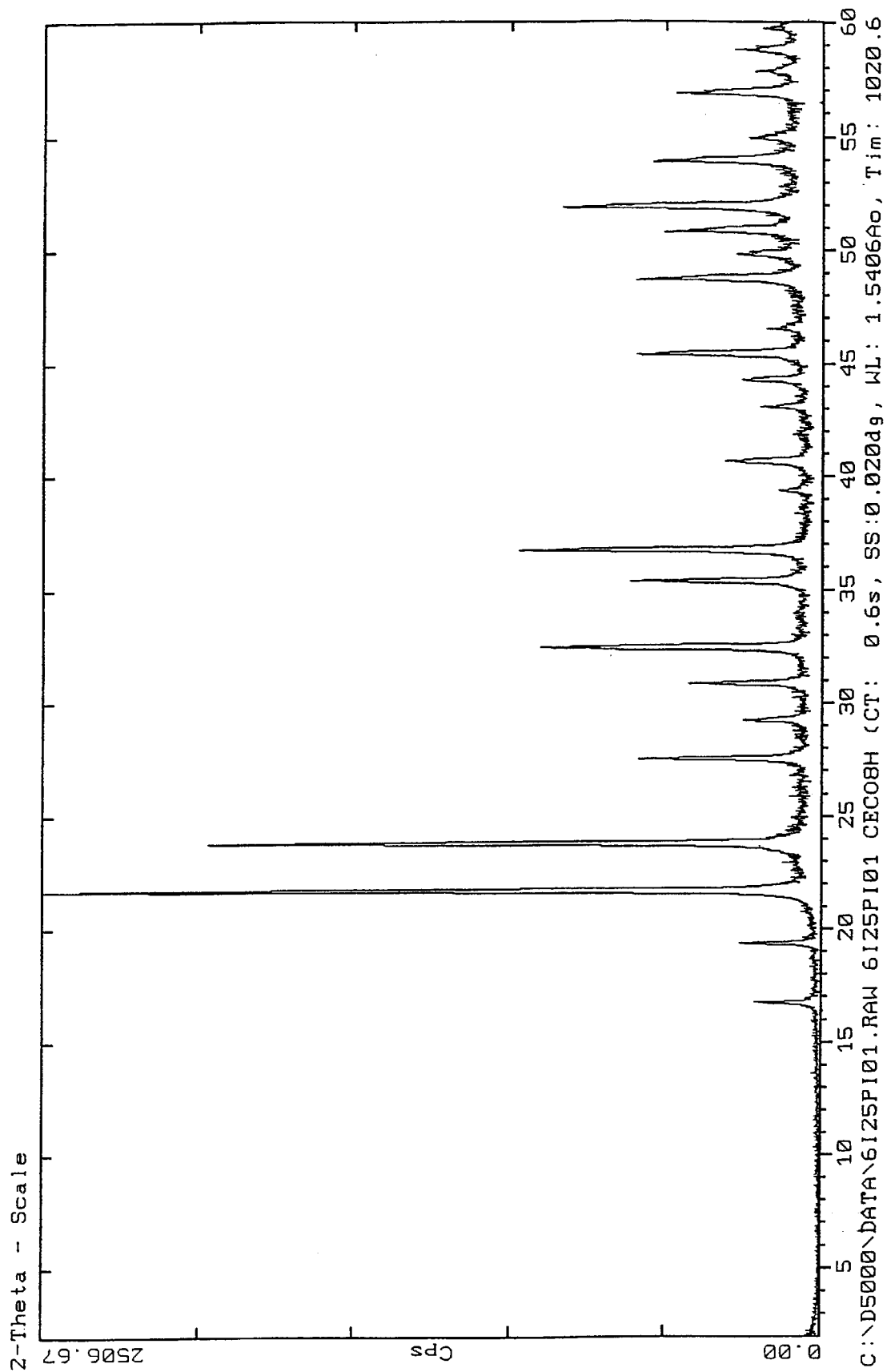
FIG. 5 is an X-ray diffraction pattern of $ZrW_2O_8$ produced using a Parr bomb.

This example describes the synthesis of $ZrW_2O_8$ using a first heating step at pressures greater than ambient. A reaction mixture was formed by combining 50 ml of a 1M aqueous solution of ammonium tungstate with 50 ml of a 0.5M aqueous solution of $ZrOCl_2$. The reaction mixture was allowed to sit for 24 hours. 125 ml of 6M HCl solution were then added to the reaction mixture, which resulted in the formation of a precipitate. About 20% of the precipitate and 40 ml of the aqueous phase of the reaction mixture were placed in a Parr bomb having a release valve designed to open at a pressure of about 250 psi. The Parr bomb was heated to a temperature of about 200° C. to about 205° C. and held at this temperature for about 4.5 hours. The Parr bomb was then allowed to cool, and the solid phase separated from the liquid phase by suction filtration. The solid fraction was then heated at a temperature of about 600° C.

for about 1 hour. The crystalline, substantially single phase product of this method was shown to be $ZrW_2O_8$ by X-ray diffraction. See, FIG. 5.

Example 5

Figure 6:
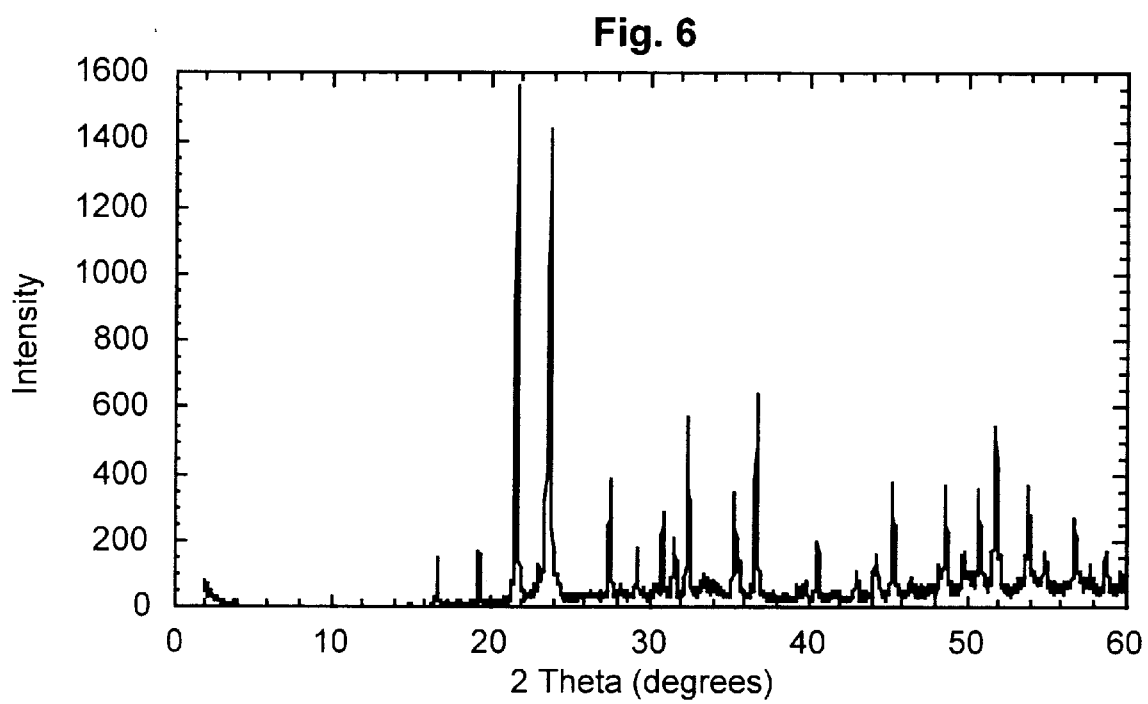
FIG. 6 is an X-ray diffraction pattern of $ZrW_2O_8$ prior to sintering.
Figure 7:
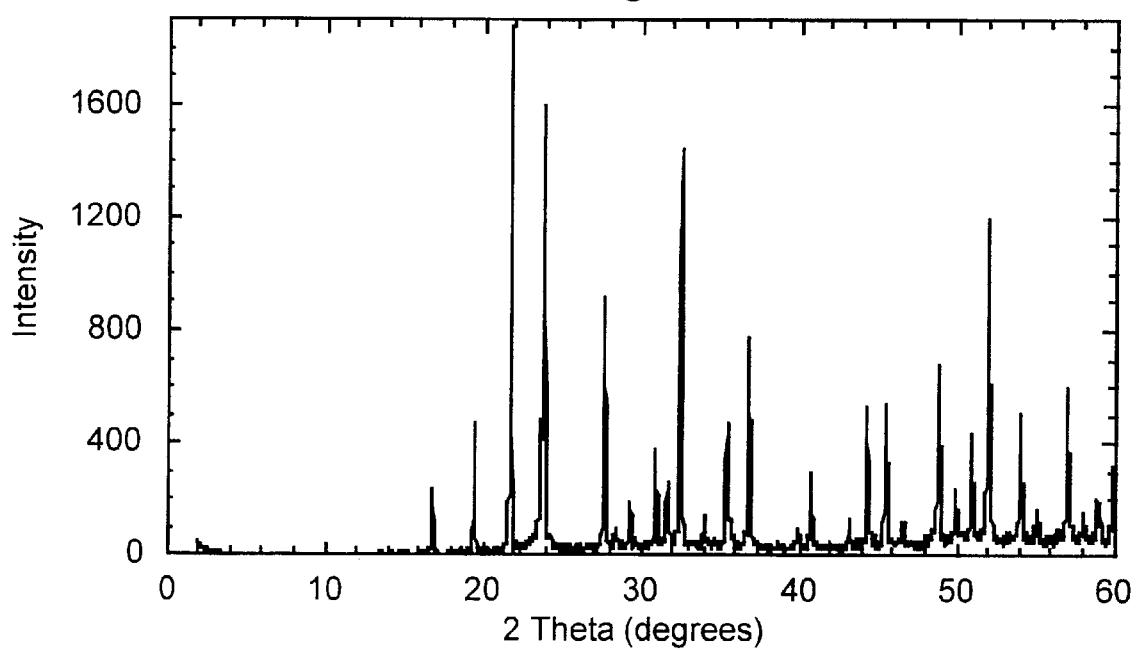
FIG. 7 is an X-ray diffraction pattern of $HfW_2O_8$ prior to sintering.
Figure 8:
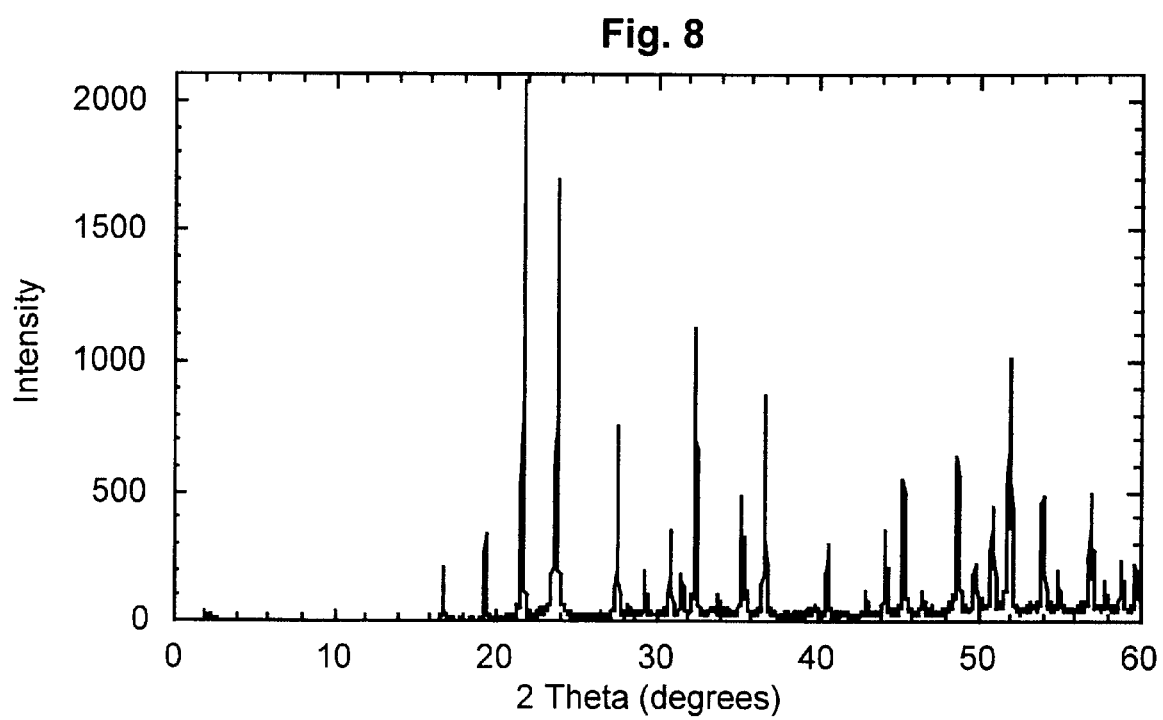
FIG. 8 is an X-ray diffraction pattern of $Zr_{0.5}Hf_{0.5}W_2O_8$ prior to sintering.
Figure 9:
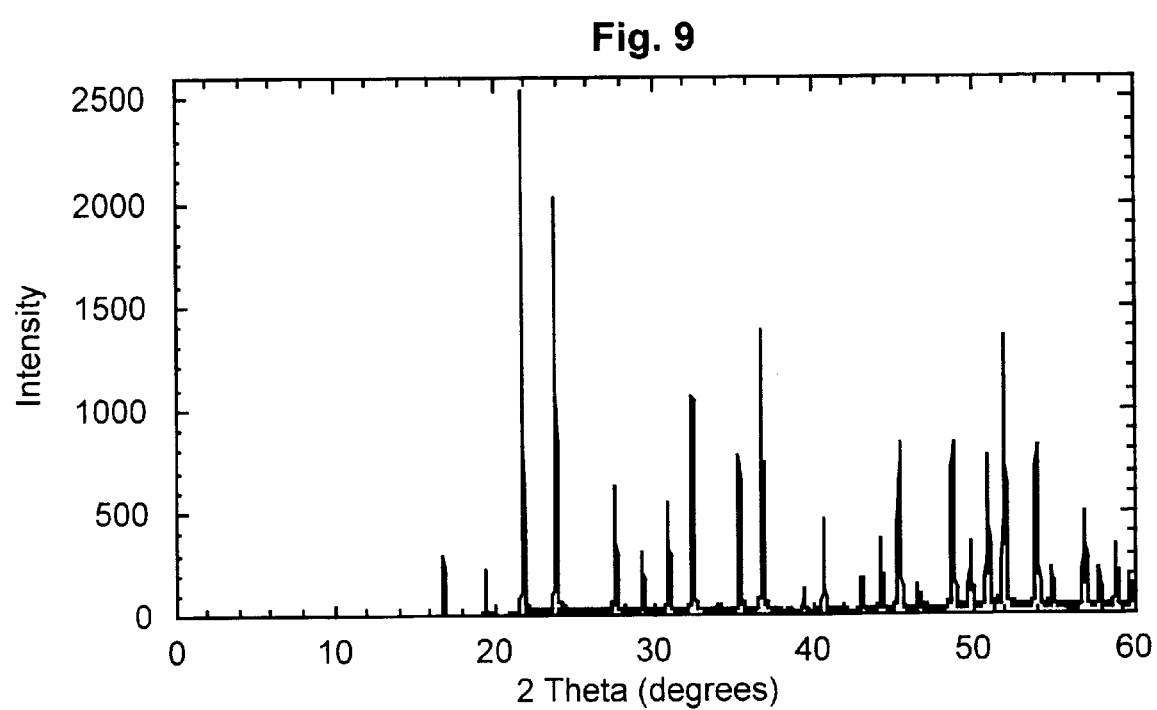
FIG. 9 is an X-ray diffraction pattern of $ZrW_2O_8$ after sintering.
Figure 10:
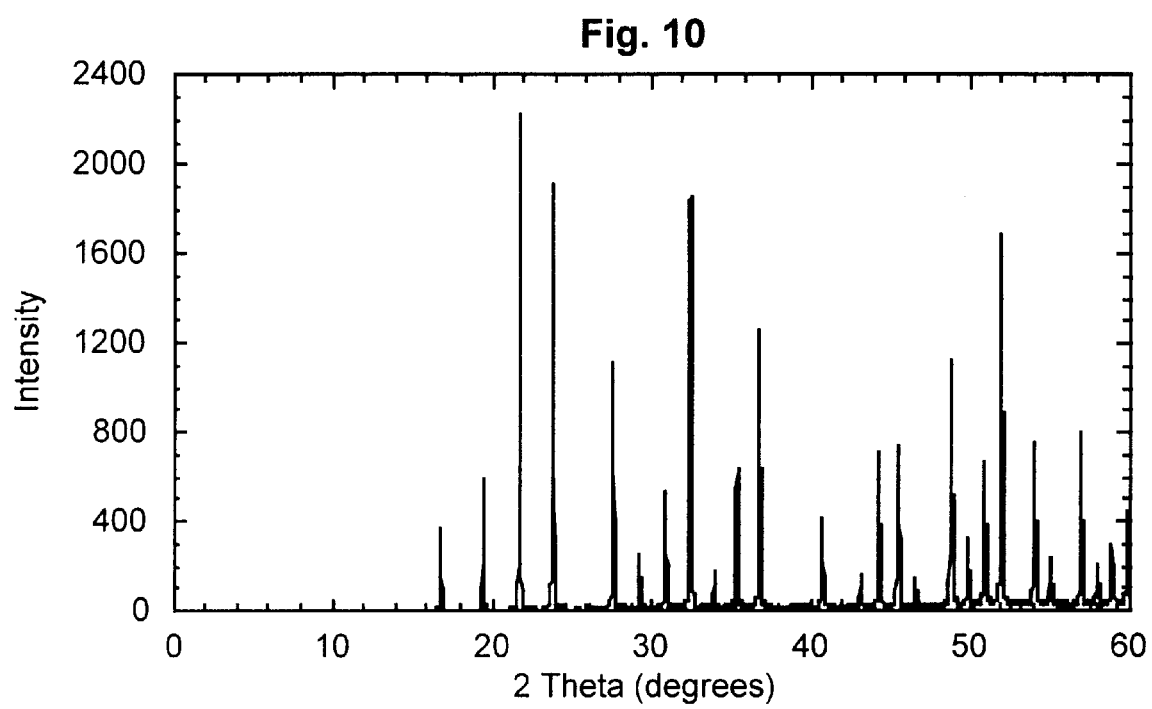
FIG. 10 is an X-ray diffraction pattern of $HfW_2O_8$, after sintering.
Figure 11:
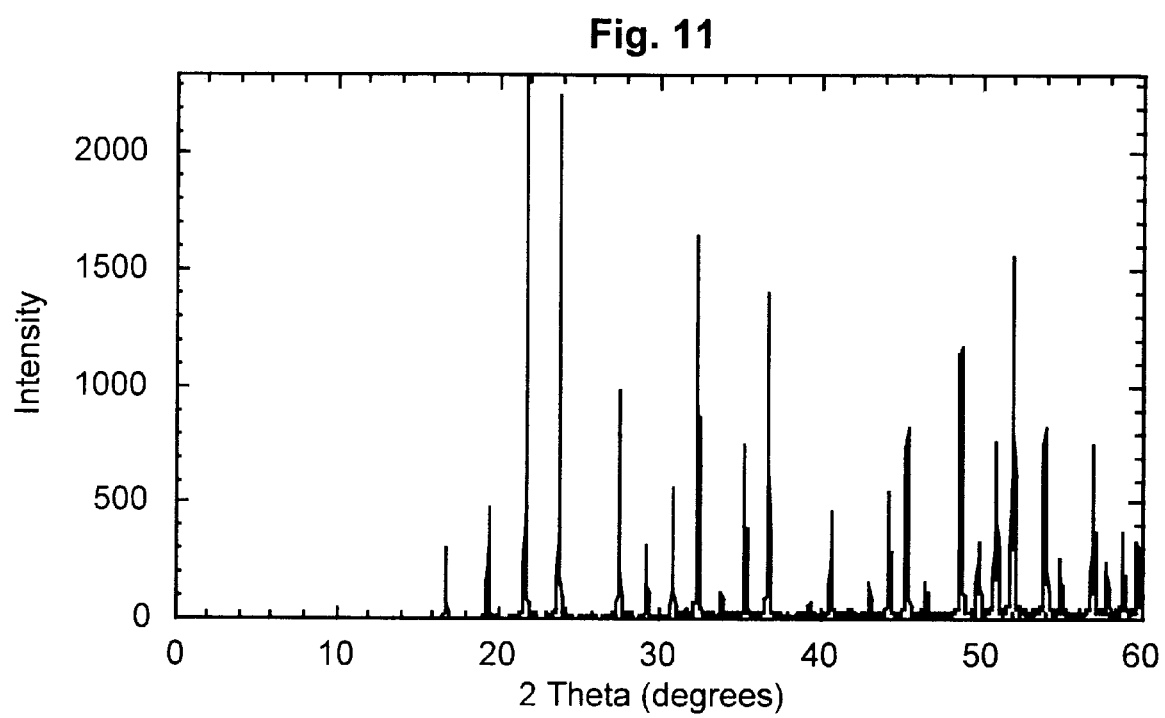
FIG. 11 is an X-ray diffraction pattern of $Zr_{0.5}Hf_{0.5}W_2O_8$ after sintering.

This example describes a novel rapid synthesis of $ZrW_2O_8$, $HfW_2O_8$ and $Zr_{0.5}Hf_{0.5}W_2O_8$ using fuel material. Stoichiometric amounts of metal salts were dissolved in a minimum quantity of 1:1 $HNO_3$ (See Table 2). A stoichiometric amount of the fuel, urea, was added and the mixture was thoroughly stirred to provide a uniform slurry. The slurry was then transferred to a Pyrex dish (80×40), which was placed in a Lindberg furnace preheated to 773 K. The slurry was taken out of the furnace after fifteen minutes. $ZrW_2O_8$, $HfW_2O_8$ and $Zr_{0.5}Hf_{0.5}W_2O_8$ were obtained (referred to as ZWO-C-1, HWO-C-1 and ZHWO-C-1, respectively). These products were ground well and analyzed for single-phase formation. The combustion-synthesized samples (ZWO-C-1, HWO-C-1 and ZHWO-C-1) products were sintered at 1473 K for thirty minutes. The high-temperature sintered samples (ZWO-C-2, HWO-C-2 and ZHWO-C-2) were analyzed for their phase purity. The X-ray diffractograms of the combustion synthesized samples ZWO-C-1, HWO-C-1 and ZHWO-C-1 are presented in FIGS. 6–8. The X-ray diffractograms of the combustion synthesized and sintered samples ZWO-C-2, HWO-C-2 and ZHWO-C-2 are presented in FIGS. 9–11.

A well-ground fine powder (1.5 g) of the combustion-synthesized product for each compound was pelletized under 1.5 ton pressure. The pelletized product was sintered at 1200° C. for one hour and the bulk density was measured from the dimensions and weight of the pellet (See Table 3).

TABLE 2

| Compound | Zirconium oxynitrate (gms) | Hafnium oxynitrate (gms) | Ammonium metatungstate (gms) | Urea (gms) | 1:1 $HNO_3$ (ml) |
|---|---|---|---|---|---|
| $ZrW_2O_8$ | 2.7380 | — | 5.2048 | 7.0070 | 26 |
| $HfW_2O_8$ | — | 3.6191 | 5.2048 | 7.0070 | 26 |
| $Zr_{0.5}Hf_{0.5}W_2O_8$ | 1.3690 | 1.8096 | 5.2048 | 7.0070 | 26 |

TABLE 3

| Compound | Weight of the pellet (gms) | Average thickness of the pellet (cms) | Average diameter of the pellet (cms) | Volume of the pellet (cc) | Density of the pellet (g/cc) | % Packing efficiency of the pellet |
|---|---|---|---|---|---|---|
| $ZrW_2O_8$ | 1.4909 | 0.2633 | 1.2660 | 0.3316 | 4.4961 | 89.0 |
| $HfW_2O_8$ | 1.4907 | 0.2748 | 1.2287 | 0.3259 | 4.5740 | 90.0 |
| $Zr_{0.5}Hf_{0.5}W_2O_8$ | 1.4908 | 0.2689 | 1.2475 | 0.3289 | 4.5341 | 89.5 |

Products made by Example 5 were NTE compounds as demonstrated by thermal expansion curves for each of these compounds similar to the illustrated by FIG. 4.

Example 6

Figure 12:
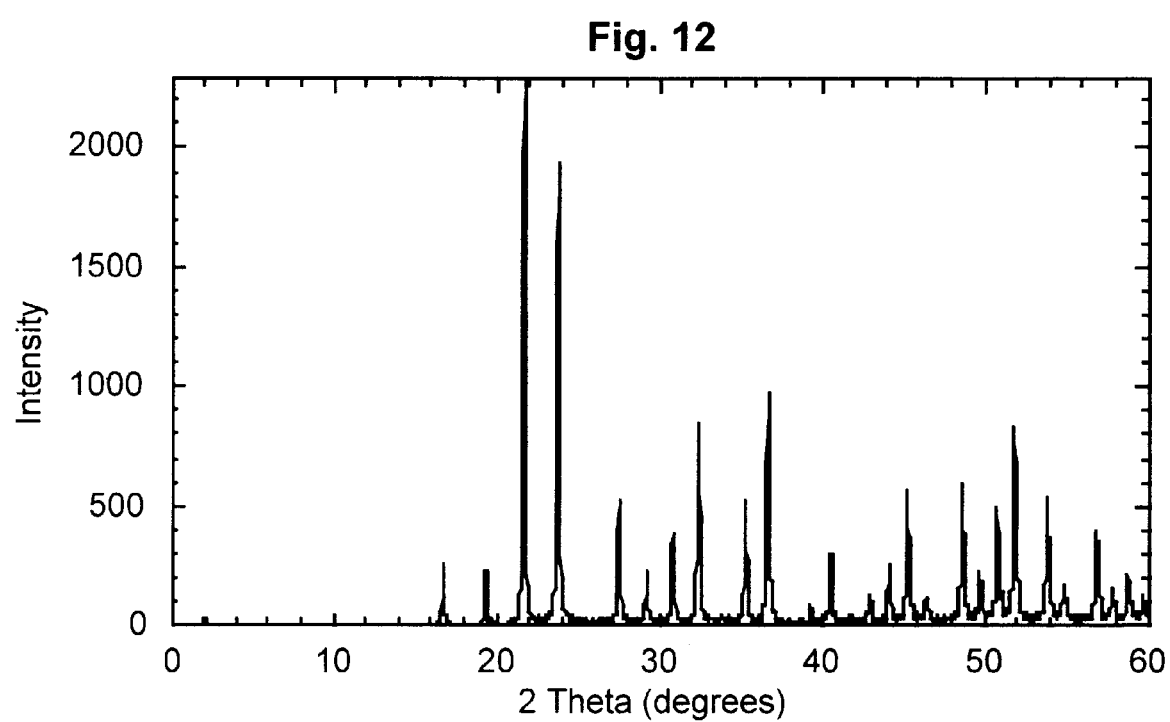
FIG. 12 is an X-ray diffraction pattern of $ZrW_2O_8$ made by Example 6 before sintering.
Figure 13:
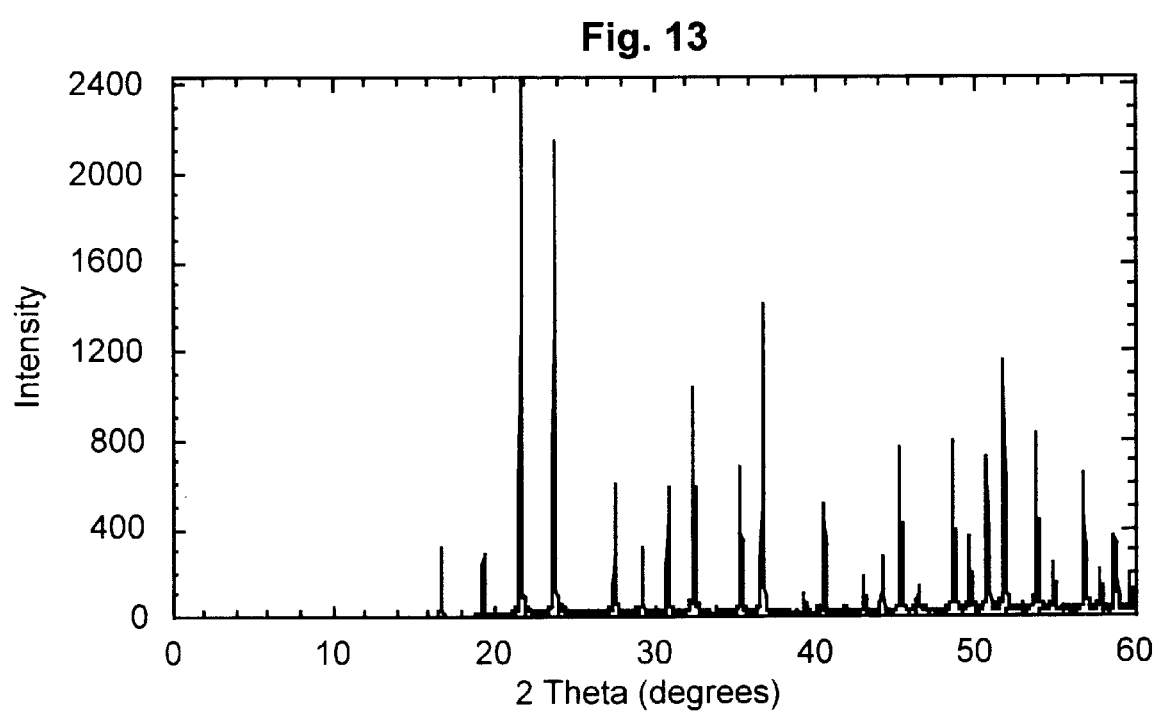
FIG. 13 is an X-ray diffraction pattern of $ZrW_2O_8$ made by Example 6 after sintering.

This example describes a low temperature method for the bulk synthesis of fine particle, crystalline $ZrW_2O_8$. 0.5M solutions of zirconium oxynitrate and ammonium metatungstate were prepared. 200ml of ammonium metatungstate solution were heated to 60° C. in a 2.0 L beaker. 100 ml of the zirconium salt solution were added to the breaker with a burette, and the mixture was stirred using mechanical stirring. The addition took approximately 1.5 hours. The addition was drop wise with very good stirring and simultaneous heating (60° C.). After the addition was complete, stirring was continued magnetically until the solution was concentrated (for one more hour). Then 250 ml of 6M HCl were added and the heating and stirring were continued until the solution was concentrated once again into a slurry (for about three hours). The slurry was transferred to a Parr bomb and was heated at 180° C. over night (for about fifteen hours) for a fast setting of gel under hydrothermal pressures. The hydrate gel was then filtered, washed with deionized water and dried in the oven (ZWO-HT-1) for three hours. This gel was then fired at 650° C. for 2.5 hours. The product obtained (ZWO-HT-2) was analyzed by XRD. The gel also was sintered at 1473K (ZWO-HT-3) for thirty minutes and was analyzed for its phase purity and bulk density. The X-ray diffractograms of the samples prior to and subsequent to sintering are presented in FIGS. 12–13.

A well ground fine powder (1.5 g) of the product (ZWO-HT-2) was pelletized under 1.5 ton pressure and then was sintered at 1200° C. for one hour and the bulk density was measured from the dimensions and weight of the pellet. The pellet after the sintering step measured 0.2704 cm in thickness and 1.2394 cm in diameter. The value of bulk density of this pellet would be 4.5962 g/cc, which would be 90.62% of the theoretical value.

The present invention has been described with reference to preferred embodiments. It will be understood by persons of ordinary skill in the art that the invention can vary from that described herein, and still be within the scope of the following claims.

We claim:

1. A method for making substantially single-phase, crystalline NTE compounds having the formula:

$$A^{4+}M^{6+}_2O_8$$

where $A^{4+}$ is $Zr^{4+}$, $Hf^{4+}$, or mixtures thereof, and $M^{6+}$ is $Mo^{6+}$, $W^{6+}$, or mixtures thereof, the method comprising:

forming a liquid mixture comprising stoichiometric amounts of (1) a soluble source of $Zr^{4+}$, $Hf^{4+}$, or mixtures thereof, and (2) a sodium-ion-free tungstate salt, a sodium-ion-free molybdate salt, or mixtures thereof;

adding an acid to the liquid mixture to acidify the liquid mixture;

refluxing the liquid mixture at ambient pressures for a period of about 48 hours or more, or at pressures greater than ambient for a period of from about 1 to about 24 hours;

separating a solid fraction from the mixture; and heating the solid fraction to a temperature within the temperature range of from about 500° C. to less than 700° C. to form a compound having the formula $$A^{4+}M_2^{6+}O_8.$$

2. The method according to claim 1 wherein the liquid mixture is an aqueous solution.

3. The method according to claim 1 wherein the sodium-ion-free tungstate salt is ammonium tungstate.

4. The method according to claim 3 wherein the sodium-ion-free salt is ammonium metatungstate.

5. The method according to claim 1 wherein the sodium-ion-free molybdate salt is ammonium molybdate.

6. The method according to claim 1 wherein the mixture comprises ammonium metatungstate and ammonium molybdate.

7. The method according to claim 1 wherein the soluble source of $Zr^{4+}$ or $Hf^{4+}$ is an oxyhalide, oxynitrate, or mixtures thereof.

8. The method according to claim 1 wherein heating the solid fraction comprises heating to a temperature within the temperature range of from about 500° C. to about 600° C. for a period of less than about 48 hours.

9. The method according to claim 1 wherein heating the solid fraction comprises heating at pressures greater than ambient.

10. A method for making substantially single-phase, crystalline NTE compounds having the formula $$A^{4+}M_2^{6+}O_8$$

where $A^{4+}$ is $Zr^{4+}$, $Hf^{4+}$, or mixtures thereof, and $M^{6+}$ is $Mo^{6+}$, $W^{6+}$, or mixtures thereof, comprising:
  forming a liquid mixture comprising stoichiometric amounts of (1) a soluble source of $Zr^{4+}$, $Hf^{4+}$, or mixtures thereof, and (2) a sodium-ion-free tungstate salt, a sodium-ion-free molybdate salt, or mixtures thereof;
  adding a mineral acid to the liquid mixture;
  refluxing the liquid mixture at ambient pressure for a period of about 48 hours or more, or at pressures greater than ambient for a period of from about 1 to about 24 hours;
  separating a solid fraction from the mixture; and
  heating the solid fraction to a temperature within the temperature range of from about 500° C. to less than 700° C. to form a compound having the formula $$A^{4+}M_2^{6+}O_8.$$

11. The method according to claim 10 wherein the sodium-ion-free tungstate salt is ammonium tungstate.

12. The method according to claim 11 wherein the sodium-ion-free salt is ammonium metatungstate.

13. The method according to claim 10 wherein the sodium-ion-free molybdate salt is ammonium molybdate.

14. The method according to claim 10 wherein the mixture comprises ammonium metatungstate and ammonium molybdate.

15. The method according to claim 10 wherein the soluble source of $Zr^{4+}$ or $Hf^{4+}$ is an oxyhalide, oxynitrate, or mixtures thereof.

16. The method according to claim 15 wherein the oxyhalide is selected from the group consisting of $ZrOCl_2$, $ZrOBr_2$, $ZrOI_2$, $HfOCl_2$, $HfOBr_2$, $HfOI_2$ and mixtures thereof.

17. The method according to claim 15 wherein the oxynitrate is $ZrO(NO_3)_2$ or $HfO(NO_3)_2$.

18. The method according to claim 10 wherein heating the solid fraction comprises heating to a temperature within the range of from about 500° C. to about 600° C. for a period of less than about 48 hours.

19. The method according to claim 10 wherein heating the liquid mixtures comprises refluxing the liquid mixture.

20. The method according to claim 10 wherein heating the liquid mixture comprises heating in a closed system.

21. The method according to claim 20 wherein heating in a closed system comprises heating the liquid mixture in a Parr bomb to a temperature within the range of from about 200° C. to about 250° C. and a pressure of from about 200 psi to about 300 psi.

22. The method according to claim 10 wherein the mineral acid is HCl or $H_2SO_4$.

23. A method for making substantially single-phase, crystalline NTE compounds having the formula:

$$A^{4+}M_2^{6+}O_8$$

where $A^{4+}$ is Zr, Hf, or mixtures thereof, and $M^{6+}$ is Mo, W, or mixtures thereof, comprising:
  forming an aqueous mixture comprising stoichiometric amounts of (1) a zirconium oxyhalide, a zirconium oxynitrate, a hafnium oxyhalide, a hafnium oxynitrate, or mixtures thereof, and (2) sodium-ion-free ammonium tungstate, sodium-ion-free ammonium molybdate, or mixtures thereof;
  acidifying the aqueous mixture using a mineral acid to obtain a pH of about 0 or less;
  refluxing the aqueous liquid mixture at ambient pressures for a period of about 48 hours or more, or at pressures greater than ambient for a period of from about 1 to about 24 hours;
  separating a solid fraction from the aqueous mixture; and
  heating the solid fraction to a temperature of from about 500° C. to less than about 700° C. for a period of time sufficient to form a compound having the formula $$A^{4+}M_2^{6+}O_8.$$

24. The method according to claim 23 wherein the mixture comprises ammonium metatungstate and ammonium molybdate.

25. The method according to claim 23 wherein heating the solid fraction comprises heating to a temperature within the range of from about 500° C. to about 600° C. for a period of less than about 48 hours.

26. A method for making substantially single-phase crystalline NTE compounds having the formula:

$$A^{4+}M_2^{6+}O_8$$

where $A^{4+}$ is $Zr^{4+}$, $Hf^{4+}$, or mixtures thereof, and $M^{6+}$ is $Mo^{6+}$, $W^{6+}$, or mixtures thereof, the method comprising:
  forming a liquid mixture comprising stoichiometric amounts of (1) a soluble source of $Zr^{4+}$, $Hf^{4+}$, or mixtures thereof, (2) a sodium-ion-free tungstate salt, a sodium-ion-free molybdate salt, or mixtures thereof, and (3) a fuel material;

adding an acid to the liquid mixture to acidify the liquid mixture; and heating the mixture within the temperature range of from about 500° C. to less than 700° C. to form a compound having the formula $$A^{4+}M_2^{6+}O_8.$$

27. The method according to claim 26 wherein the fuel is carbohydrazide.

28. The method according to claim 26 wherein the fuel material is selected from the group consisting of carbohydrazide, oxalic acid, dihydrazide, maleichyrazides, 3-methyl-3-pyrazolin-5-one, and mixtures thereof.

29. The method according to claim 26 wherein the fuel material is urea.

30. The method according to claim 26 wherein heating the mixture comprises heating the mixture at a temperature of from about 500° C. to about 600° C. for a period of less than about one hour.

31. The method according to claim 26 and further including the step of sintering the compound at a temperature of greater than about 1200° C.

32. A method for making substantially single-phase NTE compounds having the formula:

$$A^{4+}M_2^{6+}O_8$$

where $A^{4+}$ is $Zr^{4+}$, $Hf^{4+}$, or mixtures thereof, and $M^{6+}$ is $Mo^{6+}$, $W^{6+}$, or mixtures thereof, the method comprising:

forming an aqueous mixture comprising stoichiometric amounts of (1) a soluble source of $Zr^{4+}$, $Hf^{4+}$, or mixtures thereof, (2) a sodium-ion-free tungstate salt, a sodium-ion-free molybdate salt, or mixtures thereof, (3) a fuel material, and (4) $HNO_3$; and heating the mixture at a temperature of from about 500° C. to about 600° C. for a period of time of less than about one hour, thereby forming a compound having the formula $$A^{4+}M_2^{6+}O_8.$$

33. A method for making fine particle, crystalline $ZrW_2O_8$, comprising:

forming 0.5M solutions of zirconium oxynitrate and ammonium metatungstate;

heating a first volume of the ammonium metatungstate solution to a temperature of about 60° C.;

adding a second volume which is about half the first volume of the zirconium salt solution to the ammonium metatungstate;

adding 6M HCl to the mixture to form an acidified mixture;

heating the acidified mixture at 60° C. until the mixture is concentrated at a slurry;

transferring the slurry to a Parr bomb and heating the slurry in the Parr bomb and was heated at 180° C.;

filtering and washing material removed from the Parr bomb; and sintering the material at a temperature of about 1200° C. for a period of time less than about thirty minutes.

34. A negative thermal expansion material having the formula $$A^{4+}_{1-x}A'^{4+}_x M^{6+}_{2-y}M'^{6+}_y O_8$$

where $A^{4+}$ and $A'^{4+}$ are $Hf^{4+}$ or $Zr^{4+}$, $M^{6+}$ and $M'^{6+}$ are $W^{6+}$ or $Mo^{6+}$, X is from 0 to 1, and Y is from about 0.05 to $\leq 2$.

35. The negative thermal expansion material according to claim 34 selected from the group consisting of $ZrWMoO_8$, $ZrW_{1.6}Mo_{0.4}O_8$ and $ZrW_{0.5}Mo_{1.5}O_8$.

36. A composition having a thermal expansion less than that of a material included in the composition, the composition comprising:

a first material having low or negative thermal expansion and a formula of $$A^{4+}_{1-x}A'^{4+}_x M^{6+}_{2-y}M'^{6+}_y O_8$$

where $A^{4+}$ and $A'^{4+}$ are $Hf^{4+}$ or $Zr^{4+}$, $M^{6+}$ and $M'^{6+}$ are $W^{6+}$ or $Mo^{6+}$, X is from 0 to 1, and Y is from about 0.05 to <2; and a second material, the second material exhibiting a positive thermal expansion.

* * * * *

UNITED STATES PATENT AND TRADEMARK OFFICE
CERTIFICATE OF CORRECTION

PATENT NO. : 6,183,716 B1  
DATED : February 6, 2001  
INVENTOR(S) : Sleight et al.

Page 1 of 1

It is certified that error appears in the above-identified patent and that said Letters Patent is hereby corrected as shown below:

Column 7,  
Line 7, "system" should be -- system. --.

Column 13,  
Line 64, "ZrOl$_2$" should be -- ZrOI$_2$ --.

Column 16,  
Line 41, "<" should be -- $\leq$ --.

Signed and Sealed this

Twenty-third Day of April, 2002

Attest:

*Attesting Officer*

JAMES E. ROGAN  
*Director of the United States Patent and Trademark Office*